F. STAPP.
HEATING DEVICE FOR ORCHARDS.
APPLICATION FILED OCT. 12, 1908.

915,240.

Patented Mar. 16, 1909.
2 SHEETS—SHEET 1.

Witnesses
Inventor
Frederick Stapp.
Attorney

F. STAPP.
HEATING DEVICE FOR ORCHARDS.
APPLICATION FILED OCT. 12, 1908.
915,240.
Patented Mar. 16, 1909.
2 SHEETS—SHEET 2.
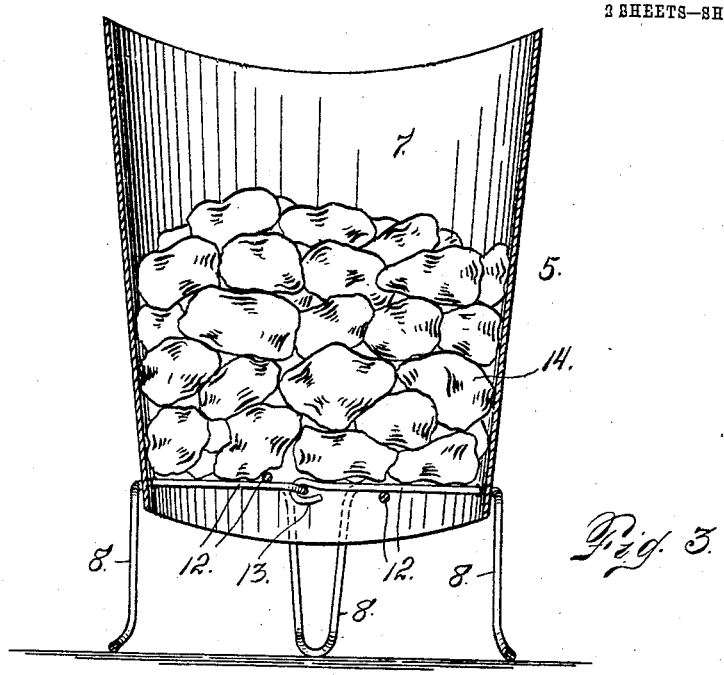
Fig. 3.
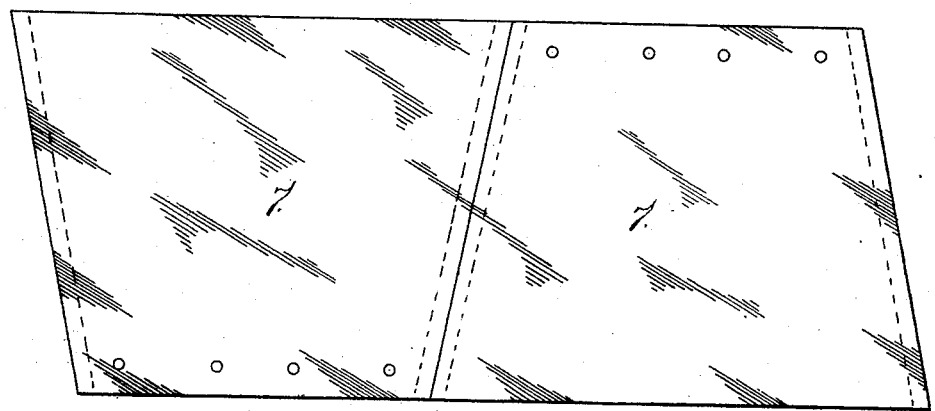
Fig. 4.
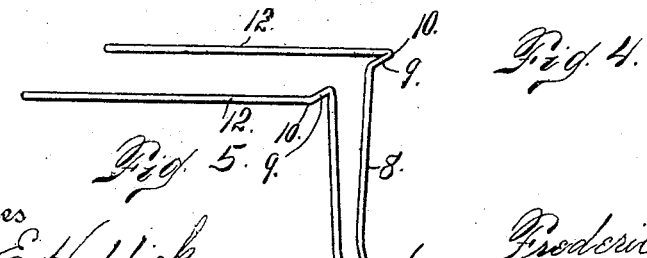
Witnesses
Otto E. Hoddick
Louise Cosner
Inventor
Frederick Stapp
by J. N. O'Brien
Attorney

UNITED STATES PATENT OFFICE.

FREDERICK STAPP, OF DENVER, COLORADO.

HEATING DEVICE FOR ORCHARDS.

No. 915,240.     Specification of Letters Patent.     Patented March 16, 1909.

Application filed October 12, 1908. Serial No. 457,433.

*To all whom it may concern:*

Be it known that I, FREDERICK STAPP, a citizen of the United States, residing in the city and county of Denver and State of Colorado, have invented certain new and useful Improvements in Heating Devices for Orchards; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in devices adapted for heating orchards, gardens or other localities to prevent frost which otherwise might injure the fruit or other vegetation.

My object is to provide a device of this class which shall be of simple and economical construction, reliable, durable and efficient in use and to these ends the invention consists of the features, arrangements and combinations heretofore described and claimed, all of which will be fully understood by reference to the accompanying drawing in which is illustrated an embodiment thereof.

Figure 1:
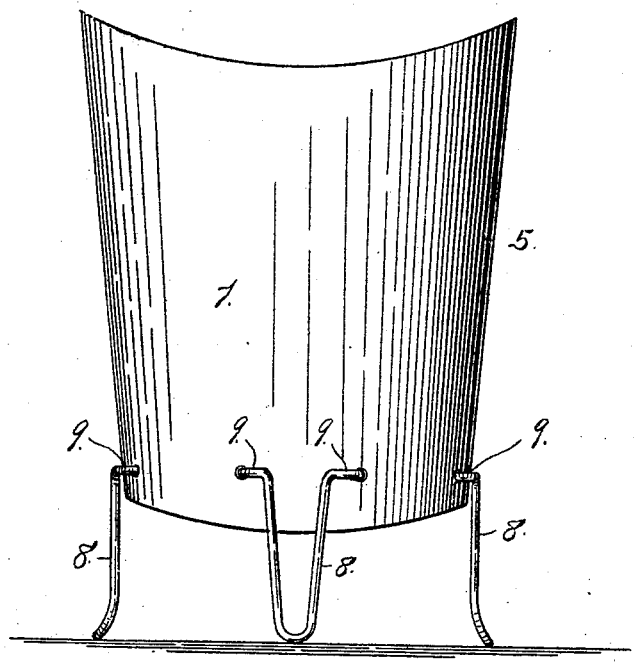
Figure 2:
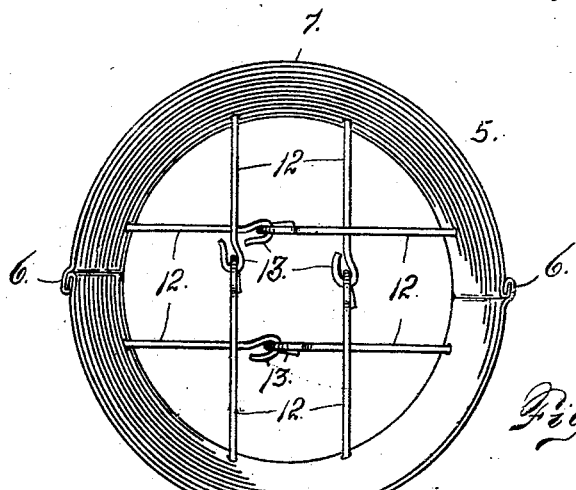

In this drawing, Figure 1 is a side elevation of a fuel receptacle or heating device equipped with my improvements. Fig. 2 is a top plan view of the same. Fig. 3 is a vertical section of the device. Fig. 4 illustrates the manner of cutting the wall members of the receptacle from a strip of sheet metal without any loss of material. Fig. 5 is a detail view of an integral wire member forming a leg or part of the support for the device, and also a part of the grate upon which the fuel rests. In this view the free extremities of the wire are left plain.

The same reference characters indicate the same parts in all the views.

Let the numeral 5 designate the fuel receptacle which is composed of two substantially twin members 7, whose side walls are interlocked, as shown at 6. These wall members 7 are first cut from a flat sheet of metal (see Fig. 4) in such a manner that there is no waste of material. When these members are flat their top and bottom edges are parallel and lie in straight lines, while after they are bent to form the walls of the receptacle, these edges are downwardly curved as illustrated in the drawing. In this respect the construction is the same as set forth in my previous application, Serial No. 448,965 filed August 17th 1908, where this particular feature of the device is explained more in detail.

The novel features of my improved construction relate more particularly to the combined supporting legs and grate, with which the fuel receptacle is equipped. As shown in the drawing, the device is equipped with four supporting legs 8, formed from an integral piece of wire and extending downwardly from the laterally bent parts 9, the wire being bent at 10 to form parts 12 which pass through the wall of the fuel receptacle, the inner extremities of the parts 12 being formed into hooks 13 which interlock with the similar hooks of corresponding parts. As shown in the drawing, the wire parts or members 12 are passed through openings formed in the wall of the receptacle, and interlock with another pair of arms entering the said wall from the opposite side. As shown in the drawing the device is equipped with four legs terminating in the arms 12 the shouldered parts 9 intervening to limit the inward movement of the said arms. After these arms are inserted, hooks 13 are formed on their inner extremities and the adjacent hooks of the meeting arms 12, are interlocked as illustrated in Figs. 2 and 3 of the drawing. Is is evident that any desired number of legs may be employed and a corresponding number of pairs of arms 12 inserted for the purpose of forming a grate or support for the fuel 14. In case the wires constituting the grate should burn out they may be readily removed and new grate members substituted at an exceedingly small cost. My improved construction as illustrated in the drawing has all these parts securely connected without the use of solder. This is an important feature in a device of this character.

When the device is in use, suitable fuel, as coal, is placed within the receptacle, resting upon the grate composed of the wire members 12. The legs 8 are of sufficient length to support the fuel receptacle above the ground or other surface upon which the device rests, for draft purposes. If the top of the device is left open there will be an upward draft through the fuel causing the latter to burn readily for heat generating purposes. If it is desired to limit the draft, suitable provision may be made for partially closing the top of the fuel receptacle. This feature, however, was illustrated in my previous application and it is therefore unnecessary to describe the same more in detail in this connection.

Having thus described my invention what I claim is:

1. In a device of the character described, the combination of a fuel receptacle formed with openings through its sides, and rods or wires passing through said openings and connected at their ends to form a fuel support, the outer portions of said wires or rods being bent at an angle to form legs for said device.

2. In a device of the character described, the combination of a fuel receptacle having openings through its sides, and rods or wires passing through said openings, and connected at their inner ends to form a fuel support, the outer portions of said wires or rods being bent to form shoulders adjacent to the wall of the receptacle, and again bent at an angle to form legs for said device, substantially as described.

3. In a device of the character described the combination of a fuel receptacle having openings through its sides, and rods or wires passing through said openings to form a fuel support, the outer portions of the said rods or wires being bent at an angle to form legs for said device.

In testimony whereof I affix my signature in presence of two witnesses.

FREDERICK STAPP.

Witnesses:
A. J. O'BRIEN,
A. EBERT O'BRIEN.